United States Patent
Ltaief et al.

(10) Patent No.: US 10,778,477 B2
(45) Date of Patent: Sep. 15, 2020

(54) EFFICIENT SPHERE DETECTOR ALGORITHM FOR LARGE ANTENNA COMMUNICATION SYSTEMS USING GRAPHIC PROCESSOR UNIT (GPU) HARDWARE ACCELERATORS

(71) Applicant: King Abdullah University of Science and Technology, Thuwal (SA)

(72) Inventors: Hatem Ltaief, Thuwal (SA); Zouheir Rezki, Thuwal (SA); Mohamed Amine Arfaoui, Thuwal (SA); Mohamed-Slim Alouini, Thuwal (SA); David E. Keyes, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/344,545

(22) PCT Filed: Sep. 27, 2017

(86) PCT No.: PCT/IB2017/055913
§ 371 (c)(1),
(2) Date: Apr. 24, 2019

(87) PCT Pub. No.: WO2018/078465
PCT Pub. Date: May 3, 2018

(65) Prior Publication Data
US 2019/0288882 A1 Sep. 19, 2019

Related U.S. Application Data

(60) Provisional application No. 62/412,561, filed on Oct. 25, 2016.

(51) Int. Cl.
H04L 5/12 (2006.01)
H04L 25/03 (2006.01)
H04B 7/0413 (2017.01)

(52) U.S. Cl.
CPC ..... *H04L 25/03242* (2013.01); *H04B 7/0413* (2013.01); *H04L 2025/03426* (2013.01); *H04L 2025/03789* (2013.01)

(58) Field of Classification Search
CPC ..... H04L 25/03232; H04L 2025/03426; H04L 2025/03789; H04B 7/0413
(Continued)

(56) References Cited

U.S. PATENT DOCUMENTS 7,974,334 B2 * 7/2011 Waters .............. H04L 25/03006
375/229
8,290,096 B2 10/2012 Shim et al.
(Continued)

OTHER PUBLICATIONS

Fatemeh Eshagh Hosseini et al ("Initial Radius Selection of Sphere Decoder for Practical Applications of MIMO Channels", Research Article, Hinddawi PublishingCorporation, Internaltional Journal of Antennas and Propagation, vol. 2012, Article ID 192964, 9 pages, DOI10.1155/2012/192964, Received Aug. 2, 2011).*
(Continued)

*Primary Examiner* — Helene E Tayong
(74) *Attorney, Agent, or Firm* — Billion & Armitage; Michael A. Collins

(57) ABSTRACT

A method of detecting u symbol transmitted over a communication channel in a multiple input-multiple output communication system. The method includes receiving a plurality of symbols transmitted over a communication channel of a multiple input-multiple output communication system. A sphere radius is initialized based on attributes of the communication channel. A first matrix of possible transmitted signals is defined as well as a second matrix of
(Continued)

received symbols. The matrix of possible transmitted signals is searched using a breadth-first search (BFS). Each level of the search tree is analyzed utilizing matrix multiplication to determine selected symbols satisfying the initialized sphere radius. A maximum likelihood solution is of the transmitted symbols is derived based on the selected symbols.

15 Claims, 6 Drawing Sheets

(58) Field of Classification Search
USPC .......................................................... 375/262
See application file for complete search history.

(56) References Cited

U.S. PATENT DOCUMENTS

| 8,615,057 | B2 | 12/2013 | Li |
| 9,094,064 | B2 | 7/2015 | Alex et al. |
| 9,124,459 | B2 | 9/2015 | Parker et al. |
| 2015/0349923 | A1* | 12/2015 | Qiao ................... H04L 1/0045 375/340 |

OTHER PUBLICATIONS

Notification of Transmittal of the International Search Report and the Written Opinion of the International Searching Authority, or the Declaration for PCT/IB2017/055913 dated Dec. 20, 2017.
"The Fixed Sphere Decoder Homepage", http;//www.homepages.ed.ac.uk/jst/sphere/, Last updated: Mar. 2009, 5 pages.
Arfaoui, et al., "Efficient sphere detector algorithm for massive MIMO using GPU hardware accelerator", Procedia Computer Science, Elsevier, Amsterdam, NL, vol. 80, Jun. 1, 2016, 2169-2180.
Chen, "GPU Acceleration for Fixed Complexity Sphere Decoder in Large MIMO Uplink Systems", Proceeding of the IEEE 28th, Canadian Conference of Electrical and Computer Engineering, Halifax, Canada, May 3-6, 2015, 771-777.
Farhoodi, et al., "Sphere Detection in MIMO Communication Systems with Imperfect Channel State Information", Communication Networks and Services Research Conference, IEE Computer Society, 2008, 228-233.
Jozsa, et al., "New Parallel Sphere Detector algorithm providing high-throughput for optimal MIMO detection", SciVerse ScienceDirect, Procedia Computer Science 18, 2013, 2432-2435.
Li, et al., "Accelerating Massive MIMO Uplink Detection on GPU for SDR Systems", 4 pages.
Wu, et al., "GPU Acceleration of a Configurable N-Way MIMO Detector for Wireless Systems", J.Sign Process Syst, Feb. 17, 2014, 14 pages.
Blas. Basic Linear Algebra Subprograms. http://www.netlib.org/blas, last visited Apr. 24, 2019.
NVIDIA. The NVIDIA CUDA Basic Linear Algebra Subroutines. https://developer.nvidia.com/cublas. Last visited Apr. 24, 2019.
NVIDIA. The NVIDIA CUDA Programming Model. https://developer.nvidia.com/cuda-downloads. Last visited Apr. 24, 2019.
Damen, et al., "On Maximum-Likelihood Detection and the Search for the Closest Lattice Point", IEEE Transactions on Information Theory, vol. 49, No. 10, Oct. 2003.
Farber, 2016. Parallel Programming with OpenACC (1st ed.). Morgan Kaufmann Publishers Inc., San Francisco, CA, USA.
Li, et al., "A High Performance GPU-based Software-defined Basestation", 48th IEEE Asilomar Conference on Signals Systems, and Computers (ASILOMAR), pp. 2060-2064, 2014.
Scogland, et al., "The Green500 List: Escapades to Exascale", Computer Science—R&D, 28(2-3):109-117, 2013.
Wu, et al., "Implementation of a High Throughput Soft MIMO Detector on GPU", J Sign Process Syst (2011) 64:123-136, Sep. 4, 2010.
Yin, et al., "A 3.8 Gb/s Large-Scale MIMO Detector for 3GPP LTE-Advanced", 2014 IEEE International—Conference on Acoustic, Speech and Signal Processing (ICASSP), 3879-3883.

* cited by examiner

EFFICIENT SPHERE DETECTOR ALGORITHM FOR LARGE ANTENNA COMMUNICATION SYSTEMS USING GRAPHIC PROCESSOR UNIT (GPU) HARDWARE ACCELERATORS

TECHNICAL FIELD

The present disclosure is related generally to multiple-input, multiple output (MIMO) systems, and in particle to efficient decoding of received signal in MIMO systems.

BACKGROUND

A typical wireless communication system utilizes a transmitter unit coupled to a receiver unit in a single-input, single-output (SISO) configuration. More recently, multiple-input, multiple-output (MIMO) systems that significantly increases the data transmit capacities of wireless communication systems have been developed. In particular, MIMO is based on the principle that multipath propagation spatial diversity) can be exploited to transmit multiple, independent information streams using co-located antennas and multi-dimensional signal processing. The transmitter includes plurality (multiple) transmit antennas that are utilized to send multiple streams of data. The receiver includes plurality (multiple) receiver antennas configured to receive the streams of data. The transmit streams take multiple paths between the transmit antennas and the receiver antennas. That is, the transmit streams can be described as going through a matrix channel that consists of all possible paths between the plurality of transmit antennas and the plurality of receiver antennas. The plurality of receive antennas generates a received signal vector that is decoded into an approximation of the original information.

A plurality of decoding schemes may be utilized to decode the original information or symbols from the received signal vector. Linear decoders are the least complex and therefore the easiest to implement while maintaining a desired latency (e.g., 10 milliseconds (ms) or less). However, linear decoders provide suboptimal error performance. In contrast with linear decoders, non-linear decoders such as the maximum likelihood decoder (MLD), provide the best (i.e., lowest) error performance. The MLD essentially evaluates many hypotheses for all possible sequences of symbols that might have been transmitted based on all the information available at the receiver, and selects the best fit from all possible sequences. However, the complexity of MLD increases with the number of transmit antennas and increases exponentially based on the constellation of symbols, thus making MLD unworkable for most applications.

Sphere decoding is a type of non-linear decoder that provides a trade-off between the high complexity of MLD and the poor performance of linear detectors. In particular, sphere decoding searches for possible solutions to the transmitted vector within a sphere having a defined radius. The difficulty in sphere decoding is selecting the radius of the sphere. If the radius selected is too small, then very few possible solutions will be considered and the performance of the decoder might be poor, especially at low signal-to-noise ratio (SNR). Conversely, if the radius of the sphere selected is too large, then the complexity of the sphere decoder becomes essentially the same as the MLD decoder.

It would therefore be desirable to provide a method of tuning the sphere radius to optimize the performance of the sphere decoder (i.e., acceptable latency, low bit-error rate (BER)).

SUMMARY

According to some embodiments, a method of decoding a signal comprised of a plurality of symbols communicated via a multiple input-multiple output (MIMO) communication system includes receiving a signal at a receiver end of the communication channel. At the receiver side, the obtained baseband signal is a function of the transmitted signal altered byt eh MIMO channel and an additive Gaussian noise. A sphere radius is initialized based on attributes of the communication channel. A set of possible transmit signal symbols is defined based on the initialized sphere radius r. A maximum likelihood solution of the transmitted signal is selected based on the selected set of possible transmit signal symbols.

According to another embodiment, a decoder circuit for decoding a multiple-input, multiple output (MIMO) signal comprises one or more processors configured to initialize a sphere radius r based on attributes of the communication channel. The one or more processors are further configured to define a first matrix $V_k$ having size (k, $M_c G_{k-1}$), wherein k is search tree level being evaluated, $M_c$ defines a number of symbols in a constellation set, and $G_{k-1}$ defines a number of vectors at level k-1 determined to be located within the sphere radius r, wherein the first matrix $V_k$ is comprised of vectors $s_{k-1}$ located in the set $L_{k-1}$ representing the transmitted signal vectors that satisfy the sphere radius r. The one or more processors are further configured to define a second matrix $y_k$ based on the received signal $y_k$ duplicated $M_c G_{k-1}$ times. The one or more processors are further configured to utilize matrix-matrix multiplication to calculate a third matrix $P_k$ based on the equation $P_k = y_k - R_k V_k$, wherein $R_k$ is related to the QR decomposition of channel estimation H, wherein the third matrix $P_k$ is evaluated with respect to the sphere radius r to derive the set of vectors $L_k$ satisfying the sphere radius r for k=1 ... M, wherein M is the number of transmitter. The one or more processors are further configured to select a maximum likelihood solution of the transmitted signal based on the matrix $P_M$, wherein $P_M$ is the calculated third matrix $P_k$ when k=M.

According to another embodiment, a method of decoding a signal comprised of a plurality of symbols communicated via a multiple input-multiple output (MIMO) communication system comprises defining a first matrix of possible transmit signal symbols and a second matrix of received symbols based on a breadth-first search (BFS) of search tree levels defined by potential transmitted symbols. Search tree levels are traversed utilizing matrix multiplication to determine the selected symbols satisfying the initialized sphere radius, and a maximum likelihood solution of the transmitted symbols is derived based on the selected symbols.

DETAILED DESCRIPTION

The present invention provides a system and method of decoding massive multiple-input, multiple output (MIMO) wireless transmissions. In particular, the present invention utilizes a sphere decoding scheme wherein the radius of the sphere is fine-tuned to reduce the pool of possible candidates. In addition, one embodiment of the present invention utilizes a breadth-first tree traversal as opposed to a depth first tree traversal. A benefit of this approach is that breadth-first tree traversal utilizes matrix-matrix multiplication operations that may be processed in a graphics processing unit (GPU) environment that is compute-bound (as opposed to memory-bound). This is in contrast with depth-first traversal which requires vector-matrix multiplication and as a result requires memory-bound computations. By utilizing a GPU processing environment in combination with the parallelism gained via a breadth-first search tree, typically memory-bound computations are cast into compute-bound operations, the overall complexity of the MIMO decoder is reduced while maintaining real-time or near real-time processing.

Figure 1:
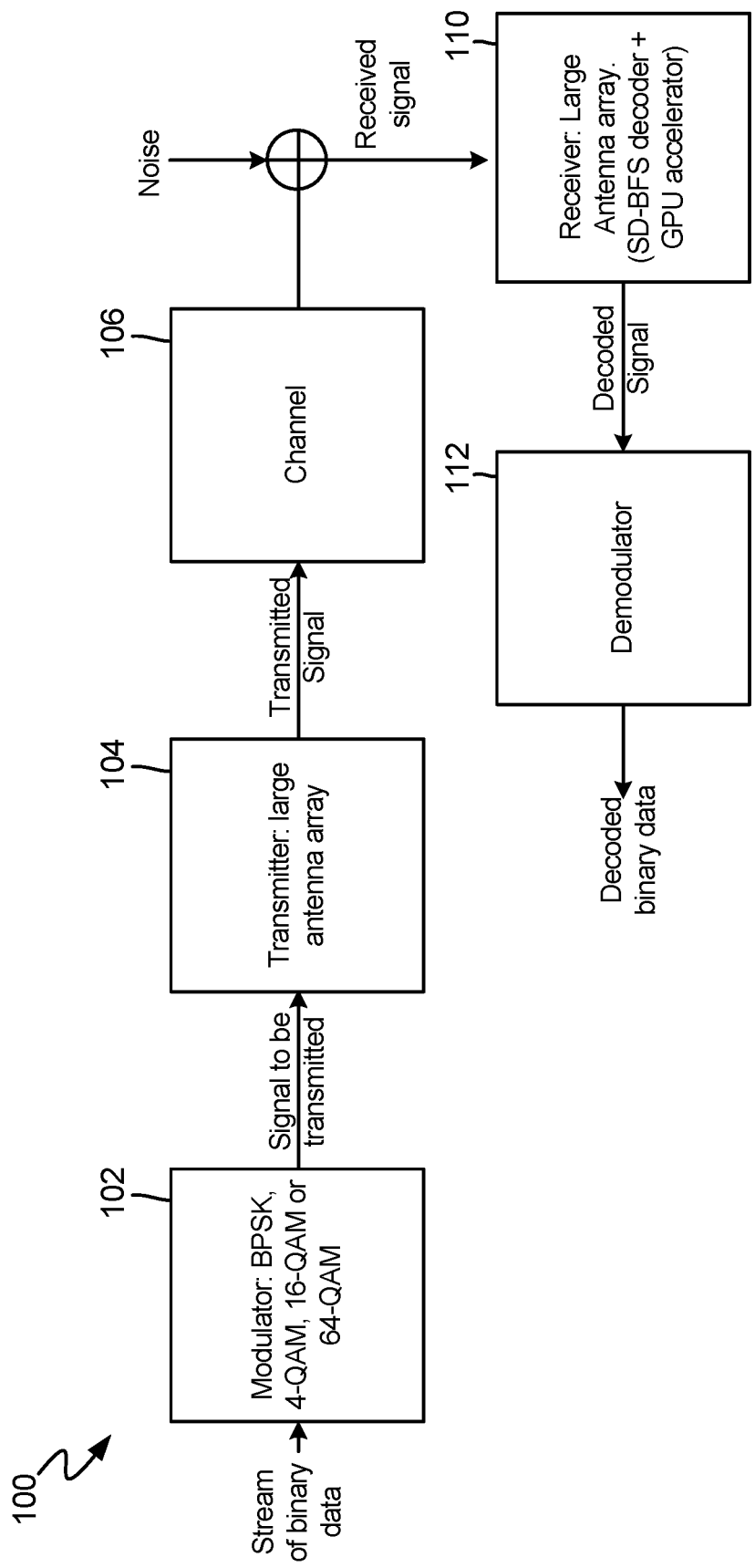
FIG. 1 is a block diagram of a massive multiple-input multiple-output (MIMO) system according to an embodiment of the present invention.

FIG. 1 is a block diagram of massive multiple-input multiple-output (MIMO) system 100 according to an embodiment of the present invention. Massive MIMO system 100 includes modulator 102, transmitter 104, channel 106, receiver 110, and demodulator 112.

In general, MIMO refers to a communication system using multiple transmit and receive antennas to exploit multi-path propagation. In the embodiment shown in FIG. 1, a binary stream of data is being communicated. Modulator 102 modulates the stream of binary data utilizing one of a plurality of modulation techniques, including but not limited to binary phase shift keying (BPSK), quadrature amplitude modulation (QAM), which in turn may utilize one of QAM methods such as 4-QAM, 16-QAM or 64-QAM. The modulated data stream is provided to transmitter 104, which is comprised of a plurality of transmitters (e.g., large antenna array).

Transmitter 104 transmits the modulated stream of data via channel 106 to receiver 110, which is a comprised of a plurality of antennas (e.g., large antenna array). Channel 106 describes the propagation paths the signal takes and may be known or unknown. In one embodiment, the large transmitter array include M transmitters, while the large receiver array include N receivers. For an M×N MIMO configuration, the transmitter sends different signal streams on M antennas and the receiver receives N different signal streams, one per receiver antenna. With respect to channel 106, in some embodiments information may be known regarding the channel at the receiver side and how the channel interacts with the transmitted signal. Known channel properties are described as channel state information (CSI). In addition to channel properties, at least some noise is added to the transmitted signal. Receiver 110 decodes the received signal and provides the decoded signal to demodulator 112. Decoding of the received signal may rely on a plurality of well-known decoders, including linear and non-linear decoders. Embodiments of the present invention propose a unique non-linear decoder for providing decoding operations at receiver 110. Performance of the decoder algorithm is measured in the bit-error rate (BER) of the decoder algorithm as well as computational complexity (e.g., time required to perform the algorithm). It is beneficial to provide good performance (e.g., low BER) at low complexity (e.g., fast computation time). Based on the modulation scheme utilized to modulate the binary stream of data originally, demodulator 112 demodulates the decoded signal to generate a binary stream output.

These operations can be described mathematically. The input-output relationship of an M×N MIMO system is described by the following equation:

$$y = Hs + w \quad (1)$$

where $y=[y_1, y_2 \ldots, y_N]^T$ is the received vector, H is N×M channel matrix, where each element $H_{ij}$ is an independent zero mean circularly symmetric complex Gaussian random variable with variance $\sigma_c^2$, and $w=[w_1, w_2, \ldots w_N]^T$, where $w_i$ is an independent zero mean circularly symmetric complex Gaussian random variable with variance $\sigma^2$. The transmitted vector (provided by transmitter array 104) is $s=[s_1, s_2, \ldots s_M]$, where $s_i$ is drawn from a finite complex constellation alphabet set of cardinal symbols $M_c$, ($s \in S = \Omega^M$). In general, two types of detection algorithms are utilized to recover transmitted signals, linear decoders and non-linear decoders. Linear decoders operate by separating the received signal into streams by multiplying the received signal y by $H_{inv}^H$ to get the decoded signal $\hat{s}=Q(H_{inh}^H \cdot y)$, wherein $Q(\cdot)$ designates a mapping function to the original constellation. Conventional linear detectors include the maximum ratio combining (MRC), the zero forcing (ZF), and the minimum mean square error (MMSE). Non-linear decoders—such as the MLD calculates the a posteriori probability in terms of likelihood ratio for each possible transmitted vector s by browsing all the set S. The ML estimate of the transmitted vector s, $\hat{s}_{ML}$ is given by the following equation:

$$\hat{s}_{ML} = \underset{s \in S}{\operatorname{argmin}} \|y - Hs\|^2 \quad (2)$$

The vector s that yields the smallest distance between the received vector y and the hypothesized message Hs is selected as the most likely. Because the optimization problem is performed over the set $S=\Omega^M$, the algorithmic complexity of the ML decoder is $O(M_c^M)$, which becomes very high for a large number of transmitted antennas and/or for a large constellation size.

The sphere decoder is a variant of the ML decoder that reduces the complexity of the ML decoder. In general, the sphere decoder solves equation (2), provided above, by solving for all points which belong to a hypersphere of radius r around the received point y. This can be expressed as follows:

$$\|y - Hs\|^2 \leq r^2 \quad (3)$$

That is, instead of searching each possible transmitted vector s for the one that provides the minimum probability of error, only those points residing within the radius r of the sphere are searched. The search process using the sphere decoder algorithm is a combinatorial optimization problem which can be solved using the ascendant-tree-search algorithm. The two known tree-search algorithms are depth-first-search trees (DFS) and breadth-first-search trees (BFS). In general, the algorithmic complexity of the BFS and DFS algorithms are identical, because the same number of points are ultimately searched. However, as discussed in more detail below, in one embodiment the massive MIMO system 100 utilizes the BFS algorithm to take advantage of additional parallelism as compared with the DFS algorithm. For a fixed radius r, the algorithmic complexity of the sphere decoder is equal to $O(Mc^{\gamma M})$, where $\gamma=\gamma_{\gamma H,w,s}(r)$ is a real random variable between 0 and 1 and whom statistic is induced by those of the channel matrix H, the signal noise at the receiver w and the transmitted signal s.

In one embodiment, receiver 110 utilizes an efficient sphere detector (SD) algorithm (hereinafter "efficient SD algorithm") to reduce the complexity of the traditional SD algorithm. Modifications to the SD algorithm may be utilized alone or in conjunction with one another, and include modifications to selection of the sphere radius as well as implementation of a parallel sphere decoder algorithm that combines the efficient breadth-first-search tree (BFS) algorithm. In some embodiments, receiver 110 is comprised of one or more processors that execute the efficient sphere detector algorithm to implement a decoder circuit. In some embodiments, at least one or more of the processors is a graphics processing unit (GPU). As discussed in more detail below, one of the benefits of the claimed invention is that the efficient SD algorithm implemented on one or more GPUs utilizes matrix-matrix multiplication that results in operations being compute-bound (i.e., does not require storage of results to memory as is the case with vector-matrix multiplication, which requires storage of a result to memory and subsequent access of the stored result to continue the calculation). Implementation of the efficient SD algorithm in a processor environment that allows for compute-bound operations is a benefit over prior art sphere decoders.

As illustrated above, the sphere radius utilized by the SD algorithm impacts the performance (in terms of BER) and the complexity (in terms of elapsed time) of the efficient SD detector. As the sphere radius increases, the sphere detector essentially becomes equivalent to the ML detector in which each possible transmitted vector s is searched, which provides high performance (high BER) and high complexity (slow computation time). An ideal choice of the criterion for selecting r is a radius such that the sphere contains the ML salutation as well as the minimum possible number of other candidates from S, so that the algorithm provides high performance (low BER) and low complexity (fast computation time).

Efficient Sphere Radius Selection

In one embodiment, the efficient SD algorithm converts the radius selection equation provided in Equation 3, above, into an equivalent problem, wherein channel matrix H=QR, wherein QR is the decomposition of the matrix H, and wherein $Q \in C^{N \times N}$ is an orthogonal matrix and $R \in C^{N \times M}$ is an upper triangular matrix. In addition, $\bar{y}=[\bar{y}_1, \bar{y}_2, \ldots, \bar{y}_N]^T$ is the vector $Q^H y$ and since Q is orthogonal, Equation 3 can be simplified with $\|y-Hs\|^2 = \|\bar{y}-R \cdot s\|^2$. As result, the sphere decoding algorithm can be re-written as follows:

$$\hat{s}_{SD} \overset{\Delta}{=} \underset{s \in L_M}{\operatorname{argmin}} \|\bar{y}-Rs\|^2 \quad (4)$$

$$L_M \overset{\Delta}{=} \{s \in S, \|\bar{y}-Rs\|^2 \le r^2\}$$

Equation (4) can be solved by considering the set $L_k$ for $1 \le K \le M$ defined by $L_k = \{s_k \in \Omega^k, \|\bar{y}_k - R_k s_k\|^2 \le r^2\}$, where $R_k$ is the lower right bloc of R and $\bar{y}_k$ is the lower bloc of $\bar{y}$. The enumeration procedure is a tree pruning algorithm, which enumerates all points satisfying Equation (4) recursively, starting with k=1.

In particular, an embodiment of the present invention evaluates the expectation of $\|\bar{y}-Rs\|^2$, which is a random variable such that its probability distribution is induced by those of R, s and w, for the case where $s=s_{ML}$. Consequently, assuming that M>N, $\|\bar{y}-Rs\|^2$ follows a gamma distribution with parameters N (representative of number of receivers) and variance $\sigma^2$, expressed as $\gamma(n, \sigma^2)$. As a result, the expected value of the random variable is expressed as follows:

$$E\|\bar{y}-Rs\|^2 = N\sigma^2 \quad (5)$$

with the variance of the probability distribution can be expressed as:

$$\operatorname{var}(\|\bar{y}-Rs\|^2) = N \propto^4 \quad (6)$$

As a result, the radius r is selected to satisfy the equation:

$$r^2 = N\sigma^2 \quad (7)$$

This selection of the radius r ensures that most of the maximum likelihood (ML) predominant solution candidates will be encapsulated within the sphere defined by radius r. In cases where the selected radius r results in an empty sphere, the radius of the sphere r is expanded. In one embodiment, the expansion is provided as follows:

$$r^2 = r^2 + \operatorname{var}(\|\bar{y}-Rs\|^2) = r^2 + N\sigma^4 \quad (8)$$

In this way, an embodiment of the present invention provides for efficient selection of a sphere radius r to be utilized in the efficient sphere detection (SD) algorithm, and for selectively increasing the size of the sphere in the event the initial radius r results in an empty set.

Parallel Breadth-First Search Sphere Decoder Algorithm

Figure 2:
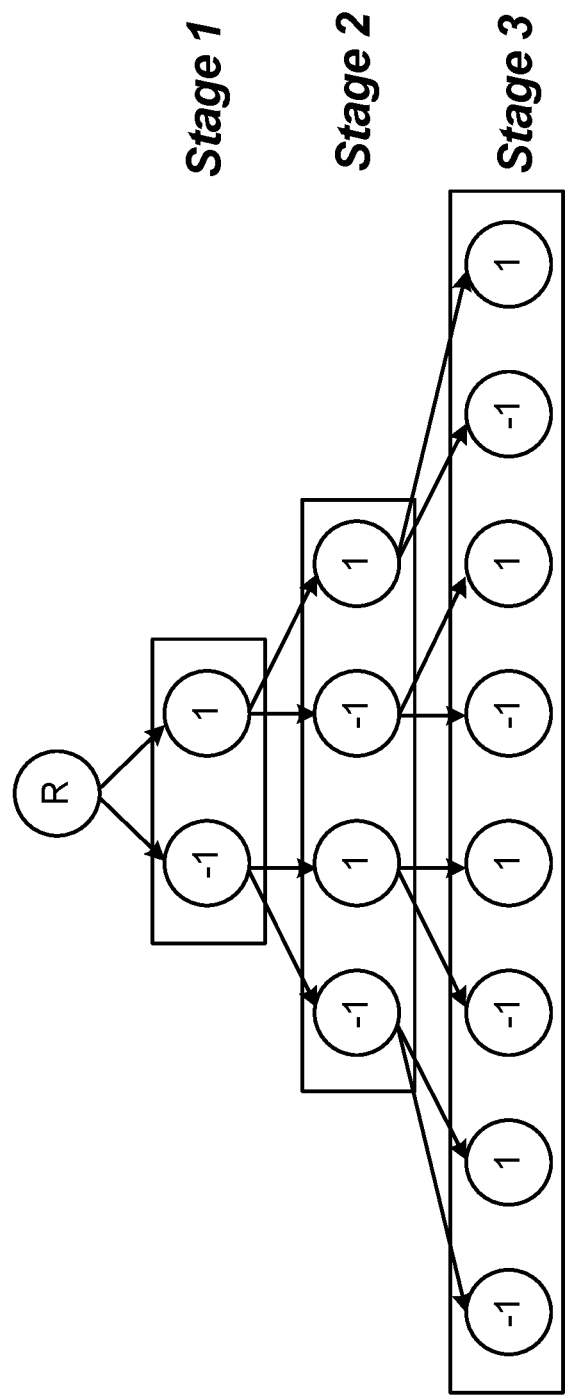
FIG. 2 is a diagram illustrating a sphere decoder implemented as a breadth-first tree search as known in the prior art.

FIG. 2 illustrates visually the tree search algorithm. The number of levels included in the tree search algorithm corresponds with the number transmitters M. For example, in the embodiment shown in FIG. 2, the number of transmitters M is equal to three, and as such the number of levels $l_k$ is equal to three. The parallel breadth-first search sphere decoder algorithm analyzes the levels of the search tree one by one (breadth first). At each stage $l_k$, we determine the set $L_k$ defined in Equation (4), which corresponds with those values falling within the defined sphere of radius $r^2$. At the bottom of the search tree—corresponding with level $l_M$—the minimum of the set $L_M$ is searched, which corresponds to the maximum likelihood (ML) solution of the sphere decoder problem. For each level $l_k$, k=2, ..., M, the matrix $M_{k-1}$ is noted which contains all the vectors of the set $L_{k-1}$, $G_{k-1}$ the cardinal of $L_{k-1}$. A matrix $V_k$ is selected with size (k, $M_c G_{k-1}$), which contains all vectors $s_{k-1} \in L_{k-1}$, duplicated $M_c$ times and then for each one modified to include a possible constellation symbol from $\Omega$. For each signal $s_k$ the quantity $\|\bar{y}_k - R_k s_k\|^2$ is evaluated to determine if it is smaller than the radius defined by $r^2$.

A benefit of this approach is that this criterion can be expressed for all signals $s_k$ simultaneously using a matrix formulation based on a matrix-matrix multiplication computational kernel. In one embodiment, the matrix $P_k$ is defined as follows:

$$P_k = \bar{y}_k - R_k V_k \quad (9)$$

where $\bar{y}_k$ is the matrix which contains the vector $y_k$ duplicated $M_c G_{k-1}$ times. The benefit of this approach stands in contrast with a depth first search algorithm, in which the criterion would be based on a matrix-vector multiplication kernel, which requires memory-bound operations.

The matrix $1 \times M_c G_{k-1}$ contains the square Euclidean norm of each vector $P_{K,i}$ in matrix $P_k$. The previous criterion is reduced now to verifying if the weights in the matrix $P_k$ are lower than $r^2$ or not (i.e., included under the sphere). For each evaluation, the matrix $M_k$ is generated and the set $L_k$ is derived. If the set $L_k$ is empty, the radius r is increased and the algorithm is started again. For the case of k=1, the process is the same as considering $L_0$, which corresponds to the root node which is an empty set. Upon reaching the last level, $l_M$, the minimum weight in matrix $P_M$ is searched and from the matrix $M_M$ the solution $s_{ML}$ is derived.

According to one embodiment of the present invention, the following algorithm is employed for the case where M≤N. The algorithm is reproduced below:

| Algorithm 1 Parallel Standard BFS Tree Algorithm | |
| --- | --- |
| Inputs: | 5: $\quad P_b = \bar{y}_k - R_k V_k$ |
| Received signal: y | 6: $\quad$ Calculate $P_k$ |
| Constellation order: Ω: | 7: $\quad$ size = 0 |
| Channel estimation: H | 8: $\quad$ for i = 1 : 1: $M_c G_{k-1}$ do |
| Noise variance estimation: $\sigma^2$ | 9: $\quad\quad$ if $P_k(i) \leq r^2$ then |
| QR Decomposition: | 10: $\quad\quad\quad M_k(:,i) = V_k(:, i)$ |
| $\quad$ H = QR | 11: $\quad\quad\quad$ size + + |
| Preliminary: | 12: $\quad\quad$ end if |
| $\quad \bar{y} = Q^H y$ | 13: $\quad$ end for |
| Initialization: | 14: $\quad$ if size ≠ 0 then |
| $\quad r^2 = M\sigma^2$ | 15: $\quad\quad$ Empty = 0 |
| $\quad M_0 = [\ ]$ | 16: $\quad$ else |
| $\quad G_0 = 1$ | 17: $\quad\quad$ Empty = 1 |
| $\quad$ Empty = 1 | 18: $\quad\quad r^2 = r^2 + M\sigma^4$ |
| 1: while Empty = 1 do | 19: $\quad\quad$ break |
| 2: $\quad$ for k = 1 : 1 : M do | 20: $\quad$ end if |
| 3: $\quad\quad$ Calculate $V_k(M_{K-1})$ | 21: $\quad$ end for |
| 4: $\quad\quad \bar{y}_k = \bar{y}_k \circ \text{mathbbI}\,(1, M_c G_{k-1})$ | 22: end while |
| | 23: $\bar{s}_{ML} = M_M(:,\min(P_M))$ |

In one embodiment, the sample algorithm illustrated above is implemented by a graphical processing unit (GPU) due to the high memory throughput in terms of bandwidth (byte/s) and high computation rate in terms of floating point operations per second (flop/s). However, most GPUs utilize memory located off-chip, which is accessed through a (relatively) slow PCIe link that operates at a bandwidth substantially lower than the internal GPU bandwidth. As a result, for parallel performance it is important to reduce the data off-loading between the CPU/device memory by reusing the freshly moved data on the GPU board as much as possible. A benefit of utilizing the breadth-first tree search algorithm outlined above is that operations involving multiple subsequent levels of the tree are cast into a single matrix-matrix multiplication kernel.

In addition, one of the challenges of implementing the parallel breadth first search tree resides in the programmability and/or productivity. Scientific codes can be accelerated on GPUs through complier directives, CUDA programming model, or accelerated libraries (e.g., NVIDIA cBLAS). In one embodiment, the breadth-first search algorithm relies on the NVIDIA implementation of the matrix-matrix multiplication kernel from cuBLAS to deliver high performance computing.

Figure 3:
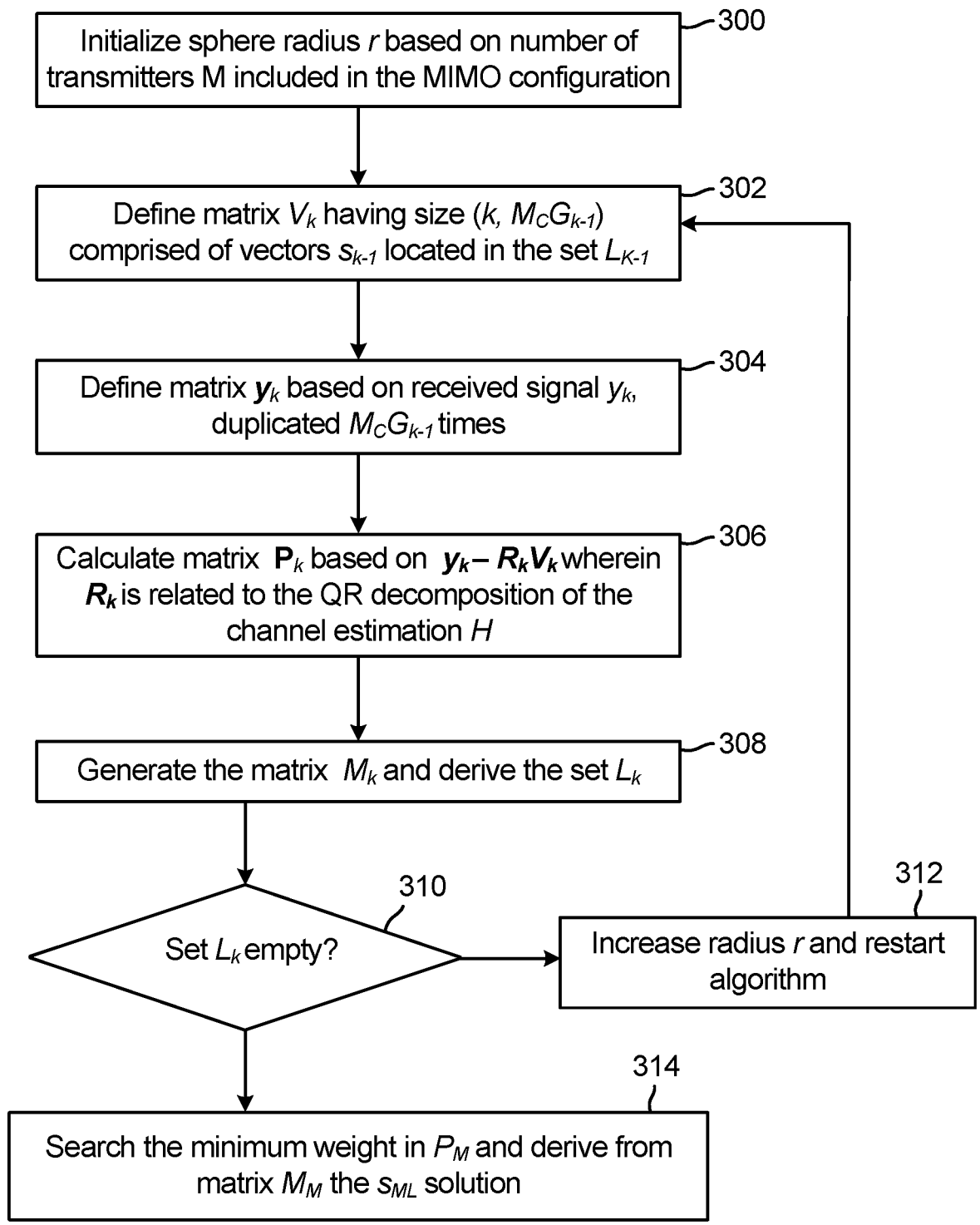
FIG. 3 is a flowchart that illustrates operations performed by the spheredecoder according to an embodiment of the present invention.

FIG. 3 is a flowchart illustrating steps performed by the efficient SD decoder according to an embodiment of the present invention. At step 300, the sphere radius r is initialized. In the embodiment shown in FIG. 3, sphere radius r is defined as a function of the number of transmitters M being utilized in the MIMO configuration. In other embodiments, the sphere radius r is defined as a function of both the number of transmitters M being utilized and the noise variance estimation $\sigma^2$ (e.g., $r = M\sigma^2$).

At step 302, a matrix $V_k$ is defined that has a size (k, $M_c G_{k-1}$). The matrix $V_k$ is comprised of all the vectors $s_{k-1}$ that are included within the set $L_{k-1}$. That is, the matrix $V_k$ is comprised of all the vectors of symbols from levels 1 through k-1 that have been determined to be located within the selected radius r of the sphere. The number of rows in the matrix $V_k$ is set to k instead of k-1 because the vectors $s_{k-1}$ further includes the next possible symbol selected from the constellation of symbols selected from the set Ω. The number of columns is defined as $M_c G_{k-1}$, wherein $M_c$ defines the number of symbols in the constellation set Ω and $G_{k-1}$ represents the number of vectors at level k-1 determined to be located within the radius r of the sphere. Because each vector located at level k-1 may be followed by any one of the constellation symbols defined within the set Ω, the number of rows within the matrix is defined as $M_c G_{k-1}$. For example, if $G_{k-1}$ equals four and the number of symbols in the constellation set Ω equals three, then the number of columns is equal to the twelve. In this way, matrix $V_k$ represents the symbols selected from levels one to k-1 that are located within the radius of the sphere, as well as all possible symbols located at level k that need to be evaluated.

At step 304, the matrix $\bar{y}_k$ is generated which contains the vector $y_k$ duplicated $M_c G_{k-1}$ times. The vector $y_k$ represents the received signal, and this vector is duplicated $M_c G_{k-1}$ to provide a matrix of the same size as $V_k$ defined at step 302.

At step 306, the matrix $P_k$ is defined as equal to $\bar{y}_k - R_k V_k$. If the depth first algorithm was utilized to determine this criterion, then a matrix-vector multiplication vector would be utilized, which would require memory bound operations. In contrast, utilizing a breadth first algorithm allows this criterion to be determined using a matrix-matrix multiplication kernel, which is compute bound and therefore runs close to the theoretical peak performance of the system. The $1 \times M_c G_{k-1}$ matrix contains the square Euclidean norm of each vector $P_{K,i+}$ in $P_k$. The previous criterion is reduced now to just verifying if the weights in the matrix $P_k$ are lower than $r^2$ or not (i.e., located within the sphere).

At step 308, for each evaluation we generate the matrix $M_k$ and we derive the set $L_k$ that indicates those values that satisfy the radius criterion (i.e., fit under the sphere).

At step 310 the set $L_k$ is evaluated to determine if the set is empty. If the set $L_k$ is empty, then the radius r is increased at step 312 and the decoding process is restarted at step 302. If the set is not empty, then at step 314 the minimum weight is searched in matrix $P_M$ and the maximum likelihood solution $s_{ML}$ is derived from the matrix $M_M$. The ML solution $s_{ML}$ represents the signal transmitted from the transmitters to the receiver as determined by the efficient SD decoder algorithm.

FIGS. 4a-4b, 5a-5b, and 6a-6b illustrate experimental results associated with embodiments of the present invention. Experiments were implemented using a host system equipped with two-sockets of ten-core Intel Ivy Bridge (20 cores total) running at 2:8 GHz with 256 GB of memory.

There are three Tesla Kepler K40 GPU accelerators attached to the CPU board through PCIe Gen3 x16, each with 12 GB of GDDR5 memory. All experiments reported in this section consider only uncoded signals and we adopt the case of a perfect channel state information, i.e., the channel matrix is known by the decoder.

Figure 4A:
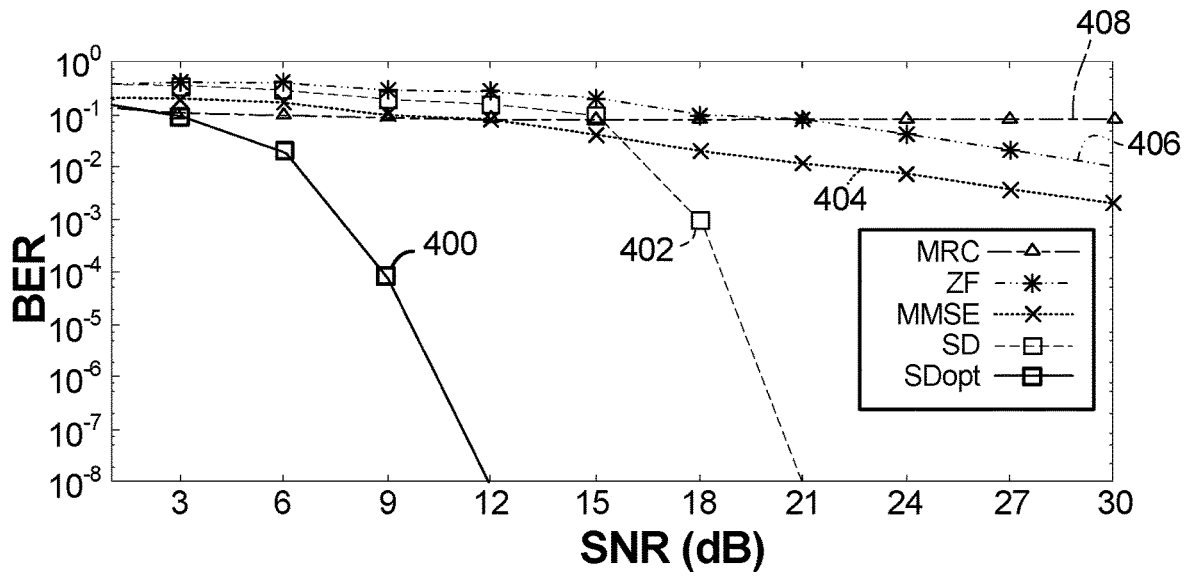
FIG. 4a is a line chart illustrating bit error rate (BER) of the sphere decoder and the linear receivers for 50×25 MIMO system and binary phase-shift keying (BPSK) modulation.
Figure 4B:
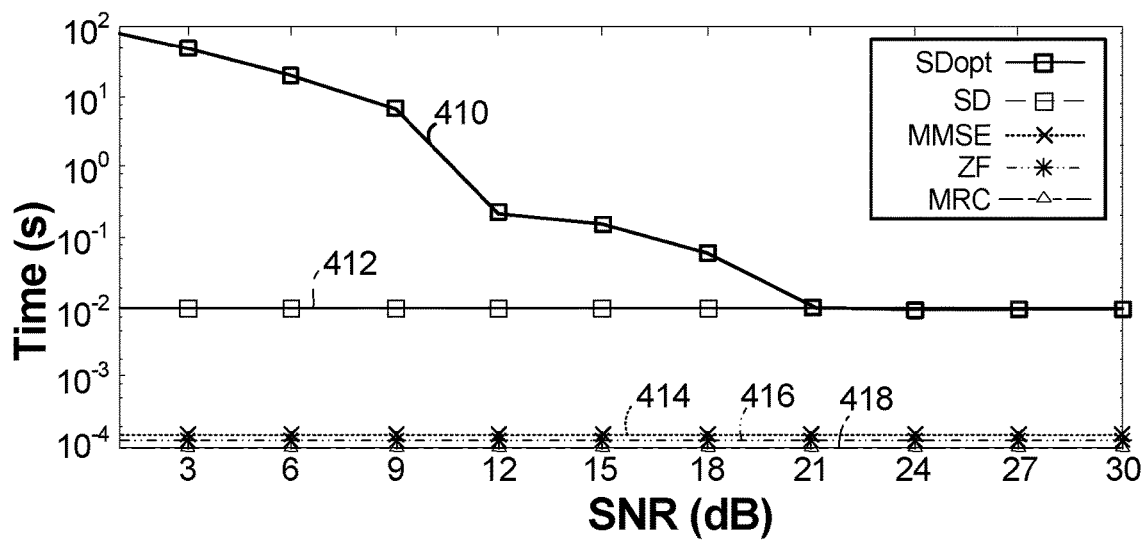
FIG. 4b is a line chart illustrating execution time of the sphere decoder and the linear receivers for 50×25 MIMO system and binary phase-shift keying (BPSK) modulation.

FIGS. 4a and 4b illustrate performance and execution times, respectively, of a plurality of decoder algorithms operating at various signal-to-noise ratios (SNRs). Results are based on decoding signals generated on a 50 (transmitter)×25 (receiver) MIMO system utilizing BPSK modulation.

In the embodiment shown in FIG. 4a, the efficient SD decoder (line 400) is compared with the standard SD decoder (line 402), the minimum mean square error (MMSE) decoder (line 404), the zero forcing (ZF) decoder (line 406), and the maximal-ratio combining (MRC) decoder (line 408). Performance is measured as a bit-error rate (BER) for various signal-to-noise ratios (SNRs). At very low SNRs (poor signal quality), the various decoders perform substantially the same, since the data are uncoded. However, as SNR improves, the performance of efficient SD decoder (line 400) is superior to the other types of decoders, including SD decoder (line 402). At a SNR of 12 decibels (dB), the efficient SD decoder provides significant improvement over alternative systems.

In the embodiment shown in FIG. 4b, the execution time required to decode signals received on the 50×25 MIMO system using BPSK modulation is shown. Once again, data is simulated for a plurality of decoder algorithms, including the efficient SD decoder (line 410) implemented according to an embodiment of the present invention, as well as standard SD decoder (line 412), and linear decoders, including MMSE decoder (line 414), ZF decoder (line 416), and the MRC decoder (line 418). In particular, while the linear decoders (e.g., MMSE, ZF and MRC decoders) provide the best (i.e., smallest) execution time, the execution time of efficient SD decoder 410 improves substantially with improved SNR. As the SNR approaches 21 dB, the execution time of efficient SD decoder 410 is approximately equal with the execution time of standard SD decoder 412, approximately $10^{-2}$ seconds (e.g., a hundredth of a second, which is approximately real-time).

Figure 5A:
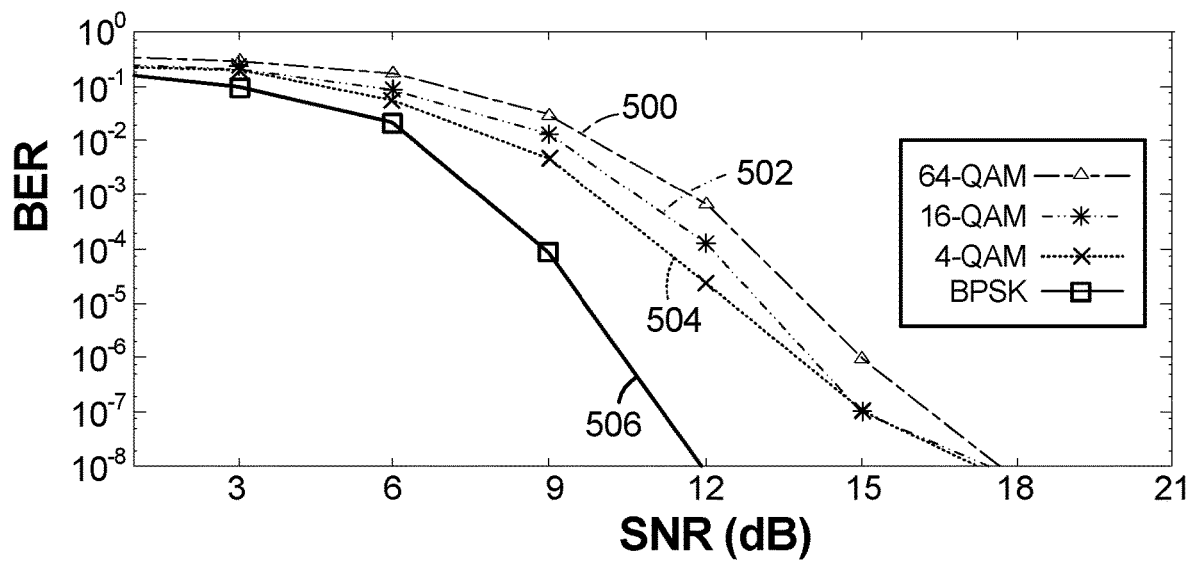
FIG. 5a is a line chart illustrating bit error rate (BER) of the sphere decoder for 50×25 MIMO system utilizing various constellations.
Figure 5B:
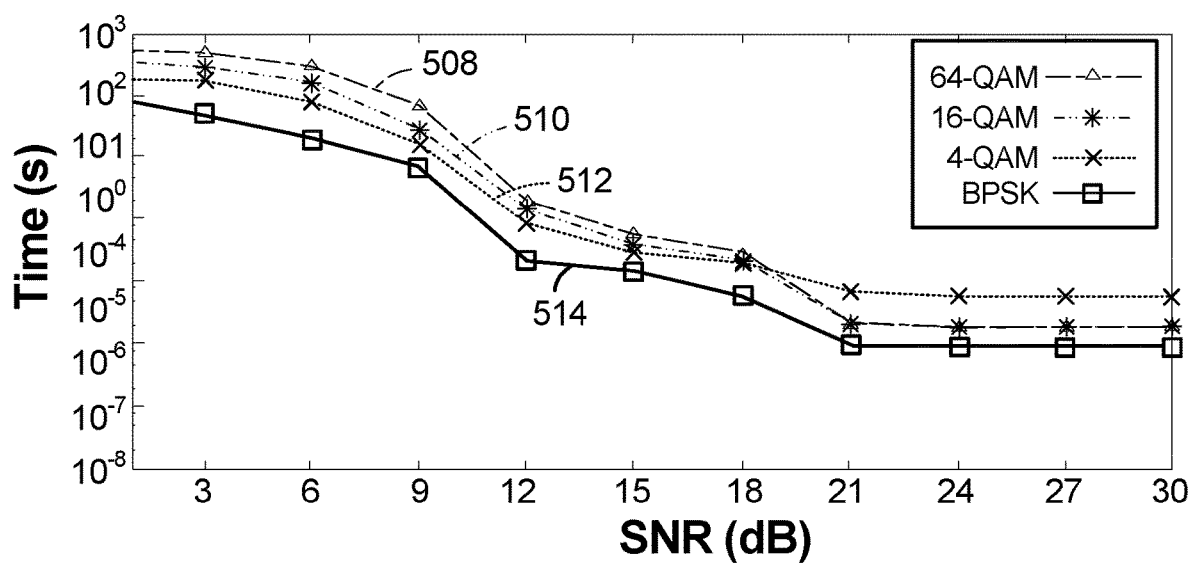
FIG. 5b is a line chart illustrating execution time of the sphere for 50×25 MIMO system utilizing various constellations.

FIGS. 5a and 5b illustrate performance and execution times, respectively, of the efficient sphere decoder (SD) algorithm utilized with respect to different constellations, including 64-QAM (line 500), 16-QAM (line 502), 4-QAM (line 504), and BPSK (line 506). In particular, FIG. 5a illustrates that for a fixed number of transmitter and receiver antennas, the performance decreases when we increase the order of the modulation (BPSK=$2^1$, 4-QAM=$2^2$, 16-QAM=$2^4$ and 64-QAM=$2^8$). Similarly, FIG. 5b illustrates faster execution times for lower order modulations (e.g., BPSK provides the fastest execution) as illustrated for 64-QAM (line 508), 16-QAM (line 510), 4-QAM (line 512), and BPSK (line 514).

Figure 6A:
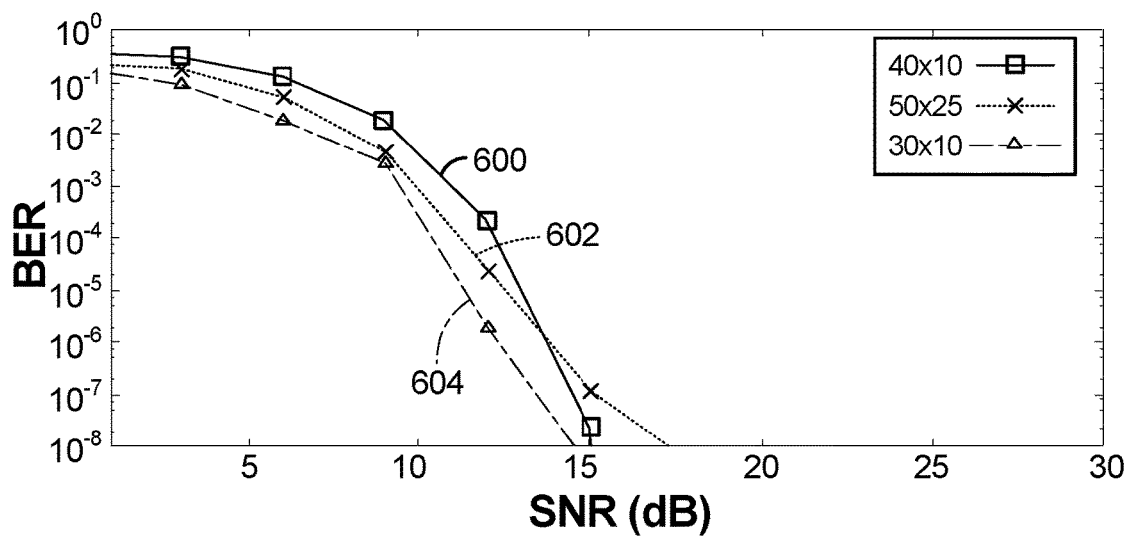
FIG. 6a is a line chart illustrating bit error rate (BER) of the sphere decoder for 4-QAM modulation and for 50×25, 30×10, and 40×10 MIMO systems.
Figure 6B:
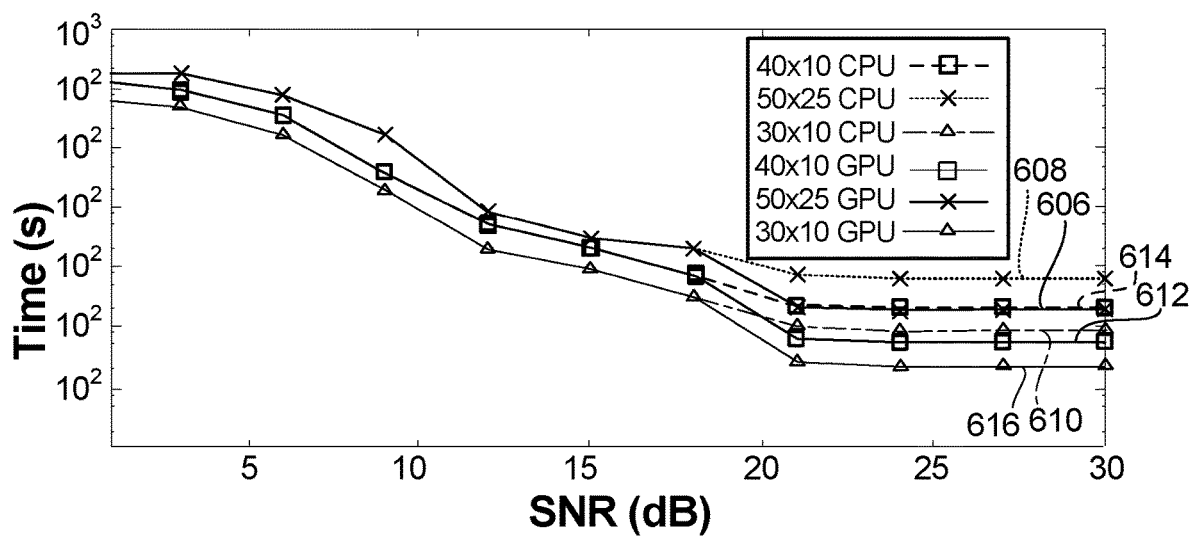
FIG. 6b is a line chart illustrating execution time of the sphere for 4-QAM modulation and for 50×25, 30×10, and 40×10 MIMO systems.

FIGS. 6a and 6b illustrate performance and execution times, respectively, of the efficient sphere decoder (SD) algorithm utilized with respect to different MIMO configurations of transmitters and receivers as well as different computing platforms (e.g., GPU versus CPU). In particular, FIG. 6a illustrates performance measured in BER of a 40×10 MIMO configuration (line 600), a 50×25 MIMO configuration (line 602) and a 30×10 MIMO configuration (line 604). FIG. 6b illustrates difference in execution time for different MIMO configuration including whether execution is performed on a CPU or GPU. For example, FIG. 6b illustrates a execution time for a 40×10 configuration implemented by a CPU (line 606), 50×25 configuration implemented by a CPU (line 608), 30×10 configuration implemented by a CPU (line 610), 40×10 configuration implemented by a GPU (line 612), 50×25 configuration implemented by a GPU (line 614), and a 30×10 configuration implemented by a GPU (line 616). In particular, FIG. 6b illustrates the gain in execution time achieved by utilizing GPUs instead of CPUs, which as described above is attributable to the ability of GPUs to make use of compute-bound computations, rather than memory bound computations.

In addition, FIGS. 6a and 6b illustrates that the execution time and the complexity increase as the number of the transmitter antennas increase. For even larger MIMO systems, the efficient SD algorithm may adjust the number of subsequent levels to process simultaneously and/or add In this way, the present invention provides a breadth-first-search (BFS) tree in the context of an efficient non-linear sphere decoder algorithm. In particular, the present invention utilizes the parallelism presented by breadth first searching to cast operations involving multiple subsequent levels of the tree into a single matrix-matrix multiplication kernel. Implementation of these operations on a GPU allows for compute-bound processing of the efficient non-linear sphere decoder, as opposed to more costly memory-bound processing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of decoding a signal comprised of a plurality of symbols communicated via a multiple input-multiple output (MIMO) communication system, the method comprising:
    receiving a signal at a receiver end of a communication channel of the multiple input-multiple output communication system, wherein the received signal is a function of a transmitted signal and the communication channel;
    initializing a sphere radius r based on attributes of the communication channel, wherein attributes of the communication channel include number of transmitters utilized in the MIMO communication system, wherein the sphere radius r is initialized based, at least in part, on the number of transmitters; and
    defining a set of possible transmit signal symbols based on the initialized sphere radius r;
    selecting a maximum likelihood solution of the transmitted signal based on the defined set of possible transmit signal symbols;
    wherein the sphere radius r is increased if no transmit signal symbols are located within the selected sphere radius, wherein the sphere radius r is increased according to an equation: $r^2=r^2+M\sigma^4$, wherein r is the sphere radius, M is the number of the transmitters, and $\sigma$ is a noise variance estimate.

2. The method of claim 1, wherein the sphere radius r is selected as a function of the number of transmitters and the noise variance estimation.

3. The method of claim 2, wherein the sphere radius r is selected according to an equation $r=M\sigma^2$, wherein r is the sphere radius, M is the number of the transmitters, and a is the noise variance estimate.

4. The method of claim 1, wherein defining the set of possible transmit signal symbols based on the initialized sphere radius r includes utilizing breadth-first tree traversal to define the set of possible transmit signal symbols based on the sphere radius r.

5. The method of claim 4, wherein defining the set of possible transmit signal symbols based on the initialized sphere radius r includes defining a first matrix $V_k$ having size $(k, M_c G_{k-1})$, for k=1 . . . M, wherein k represents a search tree level being evaluated, M represents the number of transmitters, $M_c$ represents a number of symbols in a constellation set, and $G_{k-1}$ represents a number of vectors at level k-1 determined to be located within the sphere radius r, wherein first matrix $V_k$ is comprised of vectors $s_{k-1}$ located in the set $L_{k-1}$ representing the transmitted signal vectors that satisfy the sphere radius r, and further includes defining a second matrix $y_k$ based on the received signal $y_k$ duplicated $M_c G_{k-1}$ times.

6. The method of claim 5, wherein matrix multiplication is utilized to calculate a third matrix $P_k$ based on $y_k - R_k V_k$, wherein $R_k$ is related to a QR decomposition of channel estimation H, wherein the third matrix $P_k$ is evaluated with respect to the sphere radius r.

7. A decoder circuit for decoding a multiple-input, multiple output (MIMO) signal, the decoder circuit comprising one or more processors configured to:
initialize a sphere radius r based on attributes of a communication channel;
define a first matrix $V_k$ having size $(k, M_c G_{k-1})$, wherein k is search tree level being evaluated, $M_c$ defines a number of symbols in a constellation set, and $G_{k-1}$ defines a number of vectors at level k-1 determined to be located within the sphere radius r, wherein the first matrix $V_k$ is comprised of vectors $s_{k-1}$ located in a set $L_{k-1}$ representing the transmitted signal vectors that satisfy the sphere radius r;
define a second matrix $y_k$ based on a received signal $y_k$ duplicated $M_c G_{k-1}$ times;
utilize matrix-matrix multiplication to calculate a third matrix $P_k$ based on an equation $P_k = y_k - R_k V_k$, wherein $R_k$ is related to a QR decomposition of channel estimation H, wherein the third matrix $P_k$ is evaluated with respect to the sphere radius r to derive a set of vectors $L_k$ satisfying the sphere radius r for k=1 . . . M, wherein M is a number of transmitters; and
select a maximum likelihood solution of the transmitted signal based on a matrix $P_M$, wherein $P_M$ is the calculated third matrix $P_k$ when k=M.

8. The decoder circuit of claim 7, wherein attributes of the communication channel include number of transmitters utilized in the MIMO communication system, wherein the sphere radius r is initialized based, at least in part, on the number of transmitters.

9. The decoder circuit of claim 8, wherein the sphere radius r is selected as a function of the number of transmitters and a noise variance estimation.

10. The decoder circuit of claim 7, wherein the sphere radius r is increased according to an equation: $r^2 = r^2 + M\sigma^4$ if no transmit signal symbols are located within a selected sphere radius, wherein r is the sphere radius, M is the number of the transmitters, and σ is a noise variance estimate.

11. The decoder circuit of claim 7, wherein the matrix-matrix multiplication is a compute-bound computation performed by the processor.

12. The decoder circuit of claim 11, wherein the one or more processors are graphics processing units (GPUs).

13. A method of decoding a signal comprised of a plurality of symbols communicated via a multiple input-multiple output (MIMO) communication system, the method comprising:
defining a first matrix of possible transmit signal symbols and a second matrix of received symbols based on a breadth-first search (BFS) of search tree levels defined by potential transmitted symbols, wherein defining a first matrix of possible transmit signal symbols is based on an initialized sphere radius r that includes defining a first matrix $V_k$ having size $(k, M_c G_{k-1})$, for k=1 . . . M, wherein k represents a search tree level being evaluated, M represents a number of transmitters, $M_c$ represents a number of symbols in a constellation set, and $G_{k-1}$ represents a number of vectors at level k-1 determined to be located within a selected sphere radius r, wherein first matrix $V_k$ is comprised of vectors $s_{k-1}$ located in a set $L_{k-1}$ representing a transmitted signal vectors that satisfy the sphere radius r, and further includes defining a second matrix $y_k$ based on a received signal $y_k$ duplicated $M_c G_{k-1}$ times;
searching a level of the search tree utilizing matrix multiplication to determine select symbols satisfying the initialized sphere radius; and
deriving a maximum likelihood solution of the transmitted symbols based on the selected symbols.

14. The method of claim 13, wherein matrix multiplication is utilized to calculate a third matrix $P_k$ based on $y_k - R_k V_k$, wherein $R_k$ is related to QR decomposition of channel estimation H, wherein the third matrix $P_k$ is evaluated with respect to the sphere radius r.

15. The method of claim 14, wherein deriving a maximum likelihood solution is selected based on the matrix $P_M$, wherein $P_M$ is the calculated third matrix $P_k$ when k=M.

* * * * *